United States Patent
Nakazawa (10) Patent No.: US 10,807,208 B2
(45) Date of Patent: *Oct. 20, 2020

(54) MOTOR AND SPINDLE PROTECTION STRUCTURE

(71) Applicant: FANUC CORPORATION, Yamanashi (JP)

(72) Inventor: Yasuyuki Nakazawa, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/151,562

(22) Filed: Oct. 4, 2018

(65) Prior Publication Data
US 2019/0105746 A1 Apr. 11, 2019

(30) Foreign Application Priority Data
Oct. 6, 2017 (JP) ................. 2017-195807

(51) Int. Cl.
*B23Q 11/08* (2006.01)
*B23Q 11/10* (2006.01)
(Continued)

(52) U.S. Cl.
CPC ............ *B23Q 11/0883* (2013.01); *B23Q 1/70* (2013.01); *B23Q 11/103* (2013.01);
(Continued)

(58) Field of Classification Search
CPC .......... H02K 7/08; H02K 15/16; B23Q 11/10; B23Q 11/101; B23Q 11/1015;
(Continued)

(56) References Cited

U.S. PATENT DOCUMENTS 5,235,228 A 8/1993 Nakanura et al.
5,967,716 A * 10/1999 Katsuzawa ............ B23Q 11/10
408/56

(Continued)

FOREIGN PATENT DOCUMENTS

JP 55080520 U 6/1980
JP 2002321138 A 11/2002
(Continued)

OTHER PUBLICATIONS

English Abstract and Machine Translation for Japanese Publication No. 2016-112657 A, published Jun. 23, 2016, 26 pgs.
English Abstract and Machine Translation for Japanese Publication No. 2002-369445 A, published Dec. 20, 2002, 18 pgs.
English Machine Translation of Japanese Publication No. 2002-321138 A, published Nov. 5, 2002, 16 pgs.
(Continued)

*Primary Examiner* — Tran N Nguyen
(74) *Attorney, Agent, or Firm* — Fredrikson & Byron, P.A.

(57) ABSTRACT

A motor, to which a rotary joint supporting structure for supporting a rotary joint is attached, turns a spindle. The motor includes a motor housing, a rotary shaft having a hollow shape and penetrating through the motor housing in the axial direction of the spindle, a flinger integrally attached to the rotary shaft outside the motor housing and disposed on the side to which the rotary joint supporting structure is attached, and a peripheral wall provided on the motor housing and projecting in the axial direction of the spindle so as to surround the periphery of the flinger. A plurality of cutouts are formed in the peripheral wall so as to establish communication between the interior and the exterior of the peripheral wall.

6 Claims, 5 Drawing Sheets

(51) Int. Cl.
*B23Q 1/70* (2006.01)
*B23Q 11/12* (2006.01)
*F16L 39/04* (2006.01)

(52) U.S. Cl.
CPC ........ *B23Q 11/1015* (2013.01); *B23Q 11/127* (2013.01); *F16L 39/04* (2013.01)

(58) Field of Classification Search
CPC ........ B23Q 11/103; B23Q 17/00; B23Q 1/70; F16J 15/164; F16L 39/04; F16C 32/06; F16F 15/34; G11B 19/20
See application file for complete search history.

(56) References Cited

U.S. PATENT DOCUMENTS

| | | |
|---|---|---|
| 2002/0159852 A1 | 10/2002 | Katuzawa et al. |
| 2011/0204743 A1* | 8/2011 | Meier .................... H02K 1/148 310/216.008 |
| 2016/0167185 A1 | 6/2016 | Nakazawa |

FOREIGN PATENT DOCUMENTS

| | | |
|---|---|---|
| JP | 2002369445 A | 12/2002 |
| JP | 3806312 B2 | 8/2006 |
| JP | 2014233117 A | 12/2014 |
| JP | 2015117711 A | 6/2015 |
| JP | 2016112657 A | 6/2016 |
| JP | 5980891 B2 | 8/2016 |

OTHER PUBLICATIONS

English Abstract for Japanese Publication No. 5980891 B2, published Aug. 31, 2016, 2 pgs.
English Abstract for Japanese Publication No. 3806312 B2, published Aug. 9, 2006, 2 pgs.
English Abstract and Machine Translation for Japanese Publication No. 2015-117711 A, published Jun. 25, 2015, 12 pgs.
English Abstract and Machine Translation for Japanese Publication No. 2014-233117 A, published Dec. 11, 2014, 13 pgs.
English Machine Translation for Japanese Publication No. 55080520 U, published Jun. 3, 1980, 4 pgs.

* cited by examiner

MOTOR AND SPINDLE PROTECTION STRUCTURE

CROSS-REFERENCE TO RELATED APPLICATION

This application is based upon and claims the benefit of priority from Japanese Patent Application No. 2017-195807 filed on Oct. 6, 2017, the contents of which are incorporated herein by reference.

BACKGROUND OF THE INVENTION

Field of the Invention

The present invention relates to a motor to which a rotary joint supporting structure is attached, and a spindle protection structure having a motor and a rotary joint supporting structure.

Description of the Related Art

As disclosed in Japanese Patent No. 3806312, in the conventional spindle protection structure, a plurality of cutouts are formed in a portion, of the outer peripheral surface of a rotary joint attachment housing for supporting a rotary joint, that faces a flinger integrally attached to a rotor shaft of a motor. As a result, it is possible to discharge coolant flying off from the flinger, to the outside of the rotary joint attachment housing.

SUMMARY OF THE INVENTION

However, in Japanese Patent No. 3806312, it is necessary to provide a plurality of cutouts in the rotary joint attachment housing, so that the rotary joint attachment housing has a complicated structure. Therefore, the rotary joint supporting structure having a rotary joint and a rotary joint attachment housing has been high in manufacturing cost.

It is therefore an object of the present invention to provide a motor and a spindle protection structure capable of suppressing the manufacturing cost of a rotary joint supporting structure.

According to a first aspect of the present invention, a motor for turning a spindle, to which a rotary joint supporting structure configured to support a rotary joint is attached, includes: a motor housing; a rotary shaft having a hollow shape and penetrating through the motor housing in the axial direction of the spindle; a flinger integrally attached to the rotary shaft outside the motor housing, and disposed on a side to which the rotary joint supporting structure is attached; and a peripheral wall provided on the motor housing and projecting in the axial direction of the spindle so as to surround a periphery of the flinger. In this configuration, a plurality of cutouts are formed in the peripheral wall so as to establish communication between an interior and an exterior of the peripheral wall.

A second aspect of the present invention resides in a spindle protection structure having a motor for turning a spindle and a rotary joint supporting structure configured to support a rotary joint, in which the motor includes: a motor housing; a rotary shaft having a hollow shape and penetrating through the motor housing in the axial direction of the spindle; a flinger integrally attached to the rotary shaft outside the motor housing, and disposed on a side to which the rotary joint supporting structure is attached; and a peripheral wall provided on the motor housing and projecting in the axial direction of the spindle so as to surround a periphery of the flinger, wherein a plurality of cutouts are formed in the peripheral wall so as to establish communication between an interior and an exterior of the peripheral wall, and the rotary joint supporting structure includes: the rotary joint having a rotating side member which has a through hole and is attached to the rotary shaft, and a fixed side member which has a through hole and is arranged so as to face the rotating side member; and a rotary joint housing configured to accommodate at least the rotating side member of the rotary joint, and support at least the fixed side member, wherein the rotary joint housing is attached to a distal end of the peripheral wall.

According to the present invention, the manufacturing cost of the rotary joint supporting structure can be reduced.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A motor and a spindle protection structure according to the present invention will be detailed hereinbelow by describing a preferred embodiment with reference to the accompanying drawings.

Figure 1:
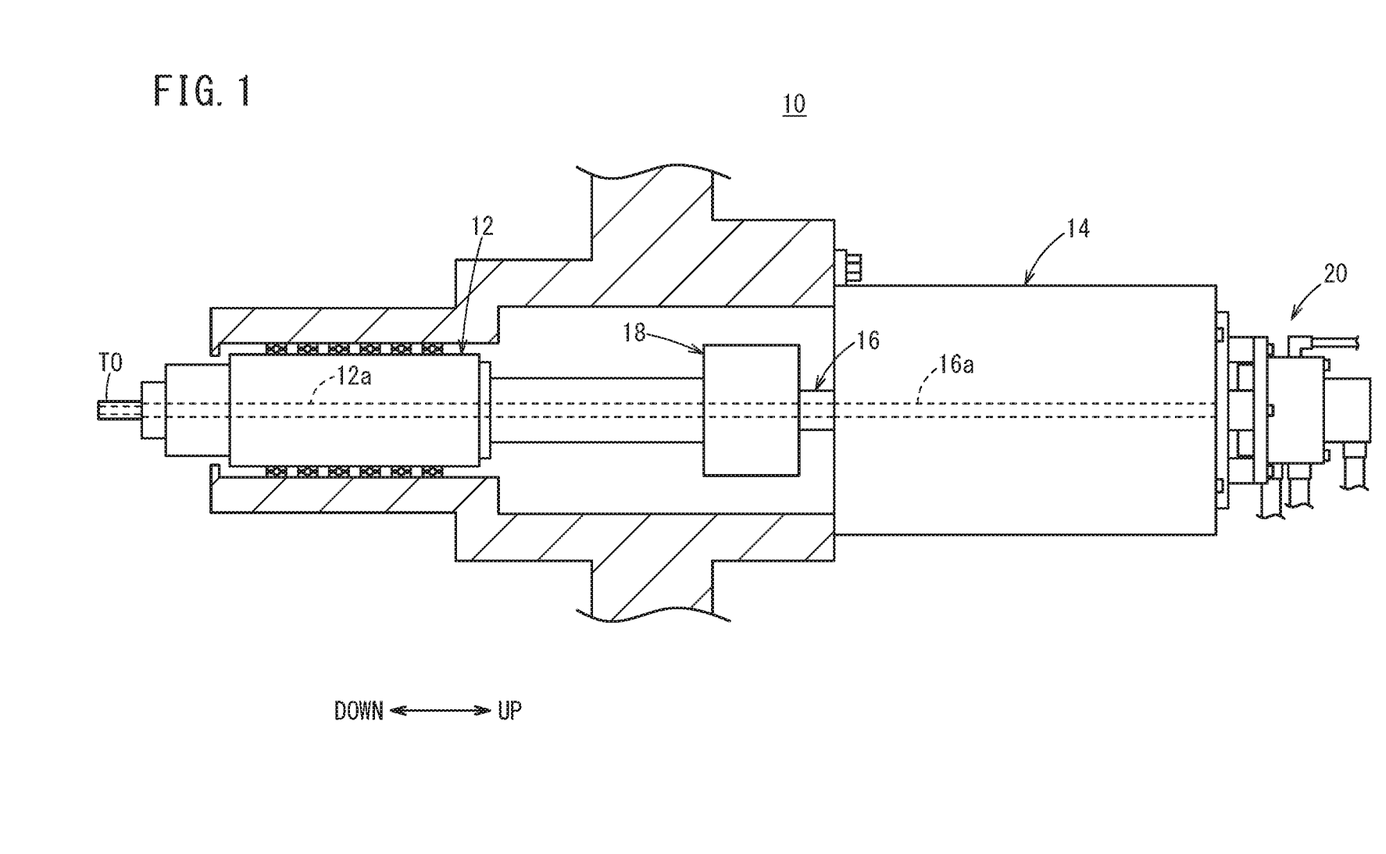
FIG. 1 is a view showing a spindle protection structure in a spindle-through coolant system.

FIG. 1 is a view showing a spindle protection structure 10 in a spindle-through coolant system. The spindle protection structure 10 includes a rotatably supported spindle 12, a motor 14, a coupling 18 that connects the spindle 12 and a rotary shaft 16 of the motor 14, and a rotary joint supporting structure 20. The spindle 12 has a hollow shape having a passage hole (through hole) 12a formed therein, and the rotary shaft 16 also has a hollow shape having a passage hole (through hole) 16a formed therein. The passage holes 12a and 16a communicate with each other. The rotary joint supporting structure 20 is attached to the motor 14 on a side opposite from the spindle 12 side. Coolant is supplied from the rotary joint supporting structure 20 to the passage hole 16a of the rotary shaft 16 of the motor 14. The coolant supplied to the passage hole 16a of the rotary shaft 16 passes through the passage hole 12a of the spindle 12 and is ejected from a tool TO attached to the distal end of the spindle 12. In the following description, the up and down directions will be described as indicated by the arrows shown in FIG. 1.

Figure 2:
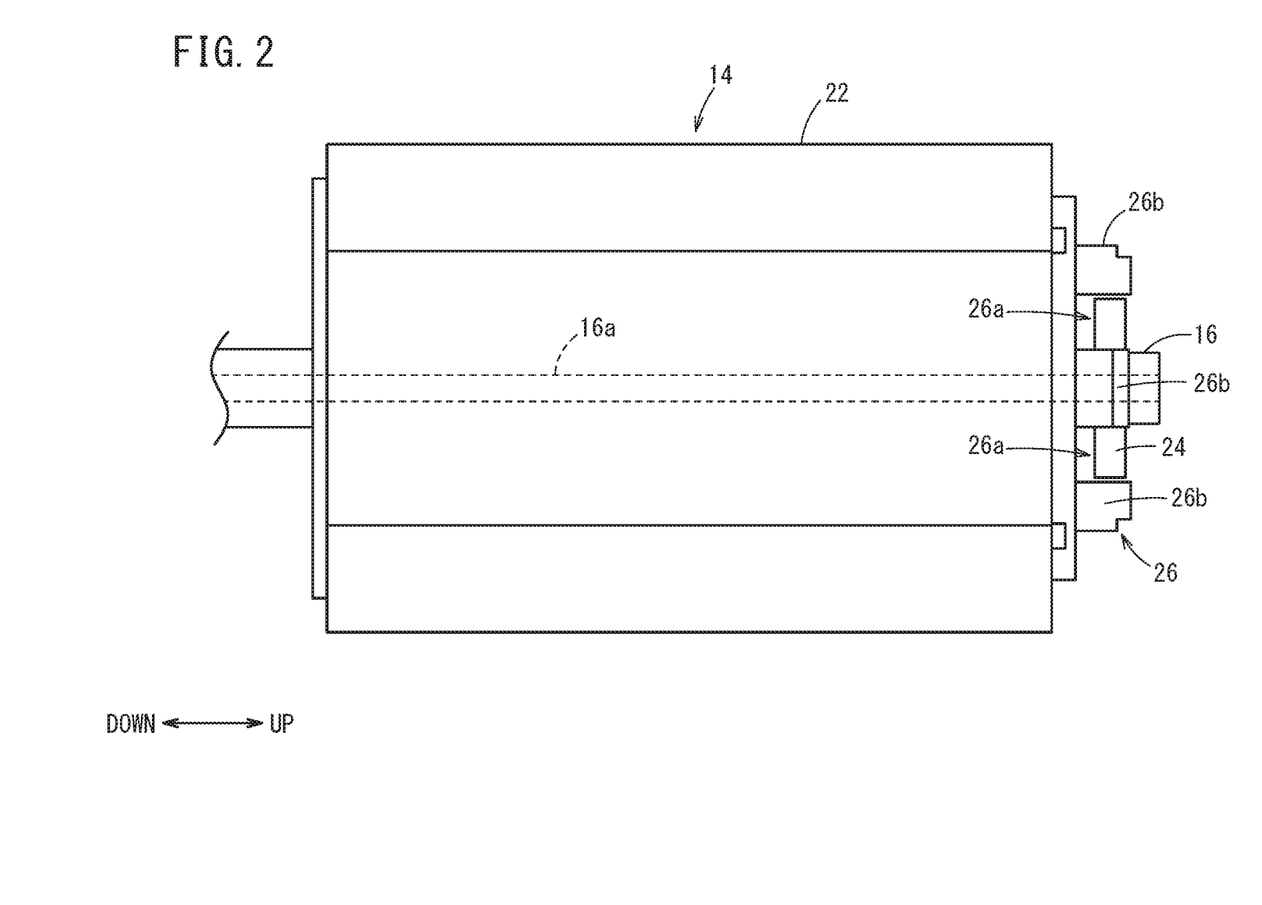
FIG. 2 is an external side view of a motor.
Figure 3:
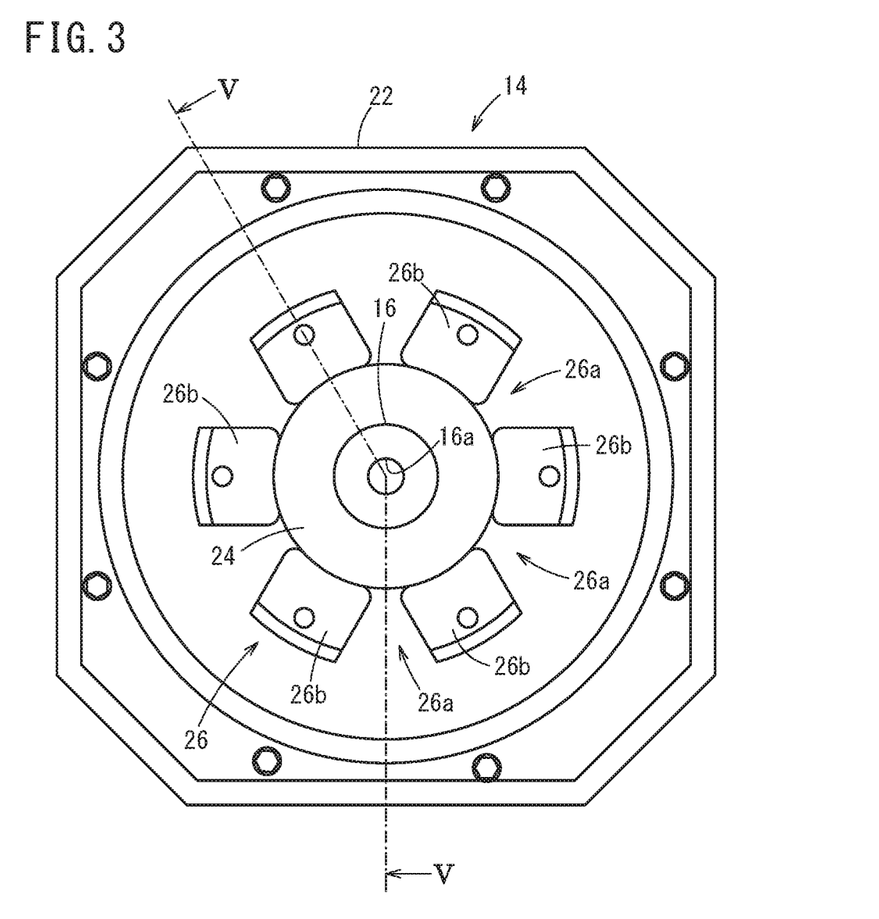
FIG. 3 is an external rear view of a motor as viewed from a side where a rotary joint supporting structure is attached.

Next, a specific configuration of the motor 14 will be described with reference to FIGS. 2 and 3. FIG. 2 is an external side view of the motor 14, and FIG. 3 is an external rear view of the motor 14 as viewed from a side where the rotary joint supporting structure 20 is attached. The motor 14 has a motor housing 22 and the rotary shaft 16 penetrating through the motor housing 22 in the axial direction of the spindle 12.

A flinger 24 is integrally attached to the rotary shaft 16. The flinger 24 is attached to the rotary shaft 16 on the side to which the rotary joint supporting structure 20 is attached and outside the motor housing 22. That is, the flinger 24 is attached to the rotary shaft 16 on the upper side of the motor housing 22. The flinger 24 rotates together with the rotary shaft 16.

The motor housing 22 has a peripheral wall 26 projecting upward in the axial direction of the spindle 12 (rotary shaft 16) so as to surround the periphery of the flinger 24. The peripheral wall 26 is formed with a plurality of cutouts 26a so as to establish communication between the interior (the inner peripheral surface, the inside) and the exterior (the outer peripheral surface, the outer side) of the peripheral wall 26. Owing to the multiple cutouts 26a, the peripheral wall 26 is divided into a plurality of projected portions 26b that protrude upward in the axial direction. The peripheral wall 26 (the multiple projected portions 26b) protrudes and extends to the same level as the upper end face of the flinger 24 or extends beyond the level of the upper end face of the flinger 24.

Figure 4:
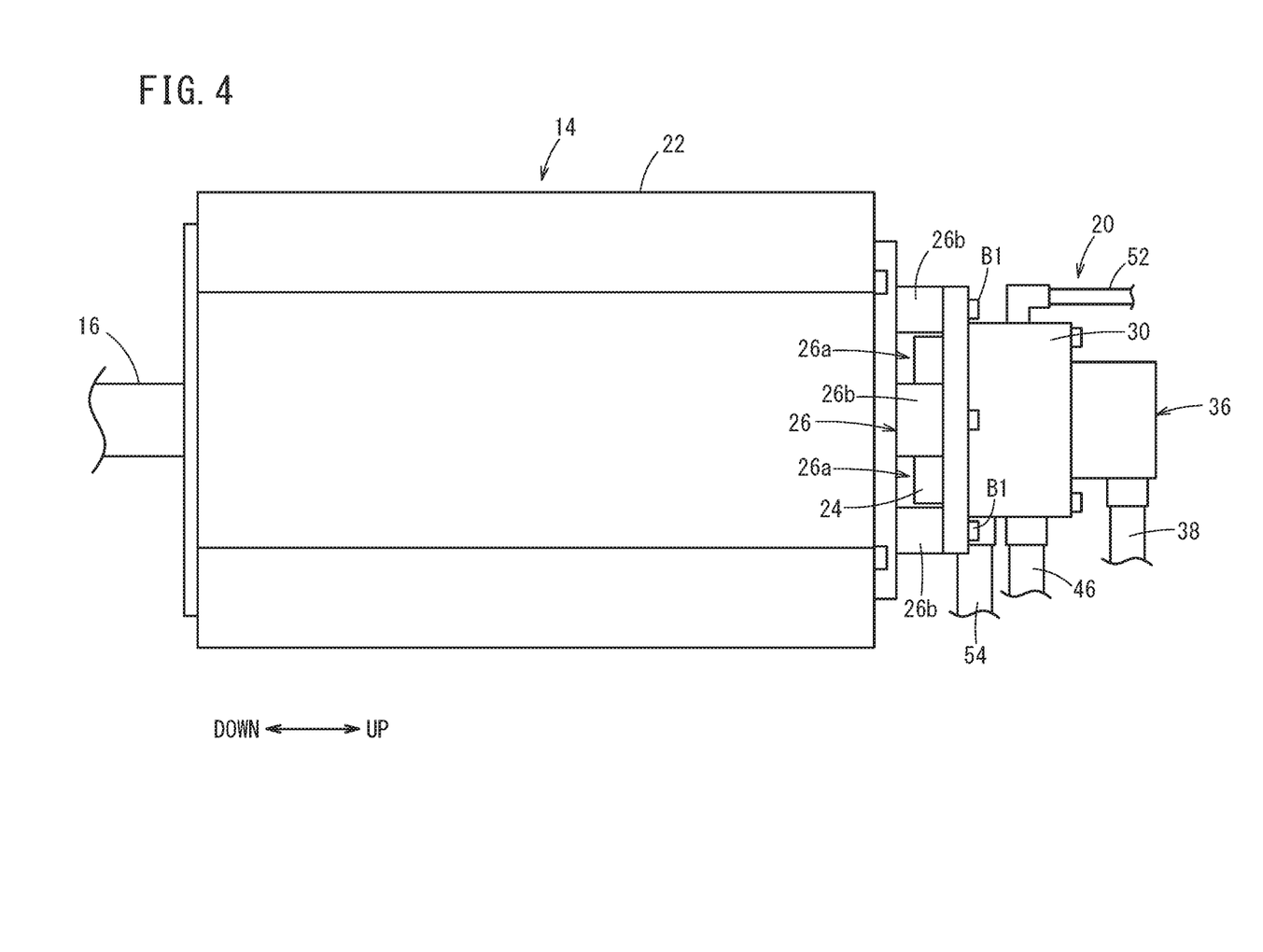
FIG. 4 is an external side view of a motor to which a rotary joint supporting structure is attached.
Figure 5:
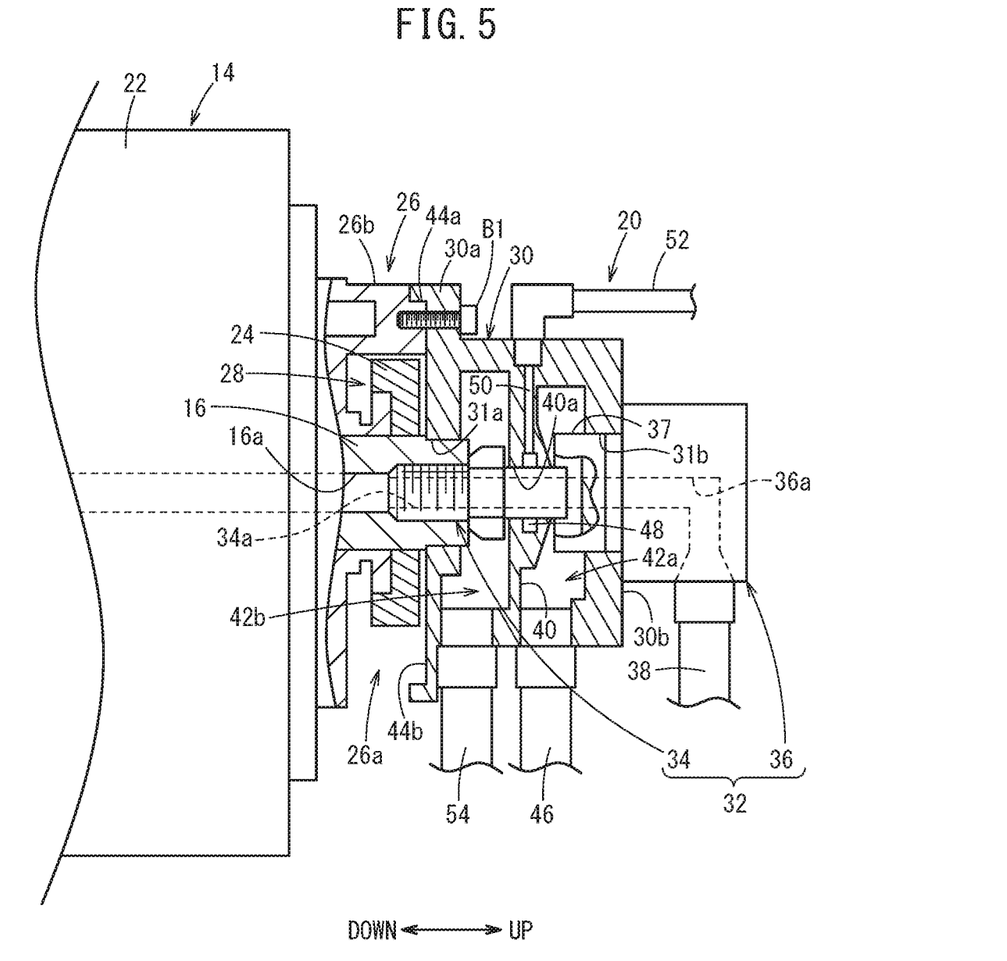
FIG. 5 is a partial sectional view of a rotary joint supporting structure attached to a motor.

FIG. 4 is an external side view of the motor 14 to which the rotary joint supporting structure 20 is attached, and FIG. 5 is a partial sectional view of the rotary joint supporting structure 20 attached to the motor 14. FIG. 5 is a sectional view taken along line V-V of FIG. 3.

The rotary joint supporting structure 20 (a rotary joint housing 30 of the rotary joint supporting structure 20) is detachably attached to the peripheral wall 26. The rotary joint supporting structure 20 (the rotary joint housing 30) is attached to the distal end (upper end) of the peripheral wall 26 by bolts B1. By attaching the rotary joint supporting structure 20 (the rotary joint housing 30) to the peripheral wall 26 of the motor 14, the flinger 24 is accommodated in a space 28 defined by the motor housing 22, the peripheral wall 26, and the rotary joint supporting structure 20 (the rotary joint housing 30).

A rotary joint 32 of the rotary joint supporting structure 20 has a rotating side member 34 having a passage hole (through hole) 34a therein and attached to the rotary shaft 16, and a fixed side member 36 arranged along the axial direction of the rotary shaft 16 so as to face the rotating side member 34. The rotating side member 34 is screw-engaged with a screw thread formed on the upper end portion of the passage hole 16a of the rotary shaft 16, and fixed to the rotary shaft 16 so as to rotate integrally with the rotary shaft 16. The passage hole 16a of the rotary shaft 16 and the passage hole 34a of the rotating side member 34 are in communication with each other. The fixed side member 36 has a socket 37 which is in sliding contact with the rotating side member 34. A coolant supply pipe 38 is connected to the side surface of the fixed side member 36. The coolant supplied from the pipe 38 passes through a passage hole (through hole) 36a of the fixed side member 36, reaches the socket 37, and further passes through the passage hole 34a of the rotating side member 34, which is in sliding contact with the socket 37, and then the coolant flows into the passage hole 16a.

The rotary joint housing 30 at least accommodates the rotating side member 34, and at least supports the fixed side member 36. The rotary joint housing 30 has a substantially cylindrical outer shape, and a bottom wall 30a thereof is attached to the distal end of the peripheral wall 26 by bolts B1. The rotary joint housing 30 is divided into two air chambers 42a and 42b in the vertical direction by a partition wall 40. A fitting portion 44a, which is spigot-fitted to the bottom wall 30a of the rotary joint housing 30, is formed at the distal end portion of the peripheral wall 26, while a recess portion 44b, which is spigot-fitted with the fitting portion 44a, is formed in the bottom wall 30a of the rotary joint housing 30. This arrangement facilitates positioning of the rotary joint supporting structure 20 (the rotary joint housing 30) to the motor 14 (the peripheral wall 26), so that the rotary joint supporting structure 20 (the rotary joint housing 30) can be easily attached to the motor 14 (the peripheral wall 26).

The bottom wall 30a has a through hole 31a in a center thereof to allow the rotary shaft 16 to penetrate therethrough. The distal end (upper end) of the rotary shaft 16 extends through the through hole 31a to the air chamber 42b in the rotary joint housing 30. The partition wall 40 has a through hole 40a allowing penetration of the rotating side member 34. The rotating side member 34 attached to the rotary shaft 16 extends through the through hole 40a to the air chamber 42a in the rotary joint housing 30. That is, the rotating side member 34 is provided extending from the air chamber 42b to the air chamber 42a.

An upper wall 30b of the rotary joint housing 30 has a through hole 31b in a center thereof allowing passage of the socket 37. The fixed side member 36 is fixed to the upper surface side of the upper wall 30b of the rotary joint housing 30 so that the socket 37 is inserted through the through hole 31b into the air chamber 42a. Thus, the distal end portion of the rotating side member 34 and the socket 37 of the fixed side member 36 are accommodated in the air chamber 42a.

Since coolant may leak through the gap between the rotating side member 34 and the socket 37, a drain pipe 46 is connected to the side surface of the air chamber 42a. This makes it possible to discharge the coolant leaking through the gap between the rotating side member 34 and the socket 37 to the outside of the rotary joint housing 30. In addition, by forming the upper surface of the partition wall 40 around the through hole 40a so as to gently protrude upward, the leaked coolant is guided to the outer periphery of the air chamber 42a, whereby discharging of the coolant from the drain pipe 46 is facilitated.

A circumferential groove 48 is formed on an interior surface of the through hole 40a of the partition wall 40, and a passage hole (through hole) 50 extending radially outward from the circumferential groove 48 is formed in the partition wall 40. The passage hole 50 is connected to an air purge pipe 52 arranged on the side surface of the air chamber 42a. By supplying compressed air from the outside through the air purge pipe 52 to the passage hole 50 and the circumferential groove 48, it is possible to facilitate discharging of the leaking coolant from the drain pipe 46.

An auxiliary drain pipe 54 is connected to the side surface of the air chamber 42b in order to deal with a situation where the coolant infiltrates into the air chamber 42b due to insufficient discharging from the air chamber 42a, i.e., because discharging cannot keep up with the leakage.

The flinger 24 prevents the coolant, which has entered into the space 28 due to insufficient discharging from the air chamber 42b, from infiltrating into the interior of the motor 14. The flinger 24 rotates together with the rotary shaft 16 of the motor 14, whereby the coolant flies off therefrom radially outward by centrifugal force. Since the multiple cutouts 26a are formed in the peripheral wall 26, the coolant that flies off radially outward from the flinger 24 is discharged to the outside through the cutouts 26a.

In this way, since the flinger 24 is attached to the rotary shaft 16 of the motor 14 while the motor housing 22 is formed with the peripheral wall 26 having the multiple cutouts 26a, it is not necessary to form any cutouts 26a in the rotary joint housing 30. Therefore, it is possible to simplify the structure of the rotary joint housing 30 and reduce the manufacturing cost of the rotary joint housing 30. As a result, the manufacturing cost of the rotary joint supporting structure 20 can be reduced.

In particular, since the flinger 24 is housed in the space 28 defined by the motor housing 22, the peripheral wall 26, and the rotary joint housing 30, the rotary joint housing 30 does not extend downward beyond the flinger 24. Therefore, it is no longer possible to form cutouts 26a in the rotary joint housing 30.

[Technical Concept Obtained from the Embodiment]

Technical concepts that can be grasped from the above embodiment will be described below.

<First Technical Concept>

The motor (14) to which the rotary joint supporting structure (20) for supporting the rotary joint (32) is attached turns the spindle (12). The motor (14) includes: the motor housing (22); the rotary shaft (16) having a hollow shape and penetrating through the motor housing (22) in the axial direction of the spindle (12); the flinger (24) integrally attached to the rotary shaft (16) outside the motor housing (22) and disposed on the side to which the rotary joint supporting structure (20) is attached; and the peripheral wall (26) provided on the motor housing (22) and projecting in the axial direction of the spindle (12) so as to surround the periphery of the flinger (24). The plurality of cutouts (26a) are formed in the peripheral wall (26) so as to establish communication between the interior and the exterior of the peripheral wall (26).

This configuration eliminates the need to provide the cutouts (26a) in the rotary joint housing (30) of the rotary joint supporting structure (20), thereby simplifying the structure of the rotary joint housing (30). Accordingly, it is possible to suppress the manufacturing cost of the rotary joint housing (30), and hence reduce the manufacturing cost of the rotary joint supporting structure (20).

The rotary joint supporting structure (20) may be detachably attached to the distal end of the peripheral wall (26), and the flinger (24) may be accommodated in the space (28) defined by the motor housing (22), the peripheral wall (26), and the rotary joint housing (30) of the rotary joint supporting structure (20). As a result, it is possible to suppress the manufacturing cost of the rotary joint housing (30), and hence reduce the manufacturing cost of the rotary joint supporting structure (20).

The fitting portion (44a) configured to be fitted with the rotary joint housing (30) of the rotary joint supporting structure (20) may be formed at the distal end of the peripheral wall (26). This facilitates the positioning of the rotary joint supporting structure (20) to the motor (14) and allows the rotary joint supporting structure (20) to be easily attached to the motor (14).

<Second Technical Concept>

The spindle protection structure (10) has the motor (14) for turning the spindle (12), and the rotary joint supporting structure (20) configured to support the rotary joint (32). The motor (14) includes: the motor housing (22); the rotary shaft (16) having a hollow shape and penetrating through the motor housing (22) in the axial direction of the spindle (12); the flinger (24) integrally attached to the rotary shaft (16) outside the motor housing (22), and disposed on the side to which the rotary joint supporting structure (20) is attached; and the peripheral wall (26) provided on the motor housing (22) and projecting in the axial direction of the spindle (12) so as to surround the periphery of the flinger (24). The peripheral wall (26) is formed with the plurality of cutouts (26a) so as to establish communication between the interior and the exterior of peripheral wall (26). The rotary joint supporting structure (20) includes: the rotary joint (32) having the rotating side member (34) which has the passage hole (through hole) (34a) and is attached to the rotary shaft (16), and the fixed side member (36) which has the passage hole (through hole) (36a) and is arranged so as to face the rotating side member (34); and the rotary joint housing (30) configured to accommodate at least the rotating side member (34) of the rotary joint (32), and support at least the fixed side member (36). The rotary joint housing (30) is attached to a distal end of the peripheral wall (26).

This configuration eliminates the need to provide the cutouts (26a) in the rotary joint housing (30), thereby simplifying the structure of the rotary joint housing (30). Accordingly, it is possible to suppress the manufacturing cost of the rotary joint housing (30), and hence reduce the manufacturing cost of the rotary joint supporting structure (20).

The flinger (24) may be accommodated in the space (28) defined by the motor housing (22), the peripheral wall (26), and the rotary joint housing (30). As a result, it is possible to suppress the manufacturing cost of the rotary joint housing (30), and hence reduce the manufacturing cost of the rotary joint supporting structure (20).

The fitting portion (44a) configured to be fitted with the rotary joint housing (30) may be formed at the distal end of the peripheral wall (26). This facilitates the positioning of the rotary joint supporting structure (20) to the motor (14), and allows the rotary joint supporting structure (20) to be easily attached to the motor (14).

The present invention is not particularly limited to the embodiment described above, and various modifications are possible without departing from the essence and gist of the present invention.

What is claimed is:

1. A motor for turning a spindle, the motor comprising:
   a motor housing;
   a rotary shaft having a hollow shape and penetrating through the motor housing in an axial direction of the spindle;
   a flinger integrally attached to the rotary shaft outside the motor housing;
   a peripheral wall provided on the motor housing and projecting in the axial direction of the spindle so as to surround a periphery of the flinger; and
   a rotary joint cylindrical-shaped housing configured to support a rotary joint, wherein the rotary joint housing includes as least one chamber;
   wherein a plurality of cutouts are formed in the peripheral wall so as to establish communication between an interior and an exterior of the peripheral wall, the peripheral wall includes a distal the rotary joint housing includes a bottom wall, the bottom wall faces the flinger and includes a through hole, and the rotary shaft penetrates the through hole,
   the distal end of the peripheral wall and the bottom wall of the rotary joint housing are detachably attached to each other.

2. The motor according to claim 1, wherein:
   the flinger is accommodated in a space defined by the motor housing, the peripheral wall, and the bottom wall.

3. The motor according to claim 1, wherein a fitting portion configured to be fitted with the bottom wall is formed at a distal end of the peripheral wall.

4. A spindle protection structure comprising:
a motor configured to turn a spindle; and
a rotary joint supporting structure configured to support a rotary joint;
the motor comprises:
a motor housing;
a rotary shaft having a hollow shape and penetrating through the motor housing in an axial direction of the spindle;
a flinger integrally attached to the rotary shaft outside the motor housing; and
a peripheral wall provided on the motor housing and projecting in the axial direction of the spindle so as to surround a periphery of the flinger, wherein a plurality of cutouts are formed in the peripheral wall so as to establish communication between an interior and an exterior of the peripheral wall, the peripheral wall includes a distal end, and the rotary joint supporting structure comprises:
the rotary joint having a rotating side member which has a through hole and is attached to the rotary shaft, and a fixed side member which has a through hole and is arranged so as to face the rotating side member; and
a rotary joint cylindrical-shaped housing includes at least one chamber, and is configured to accommodate the rotating side member of the rotary joint, and support the fixed side member, wherein the rotary joint housing includes a bottom wall, the bottom wall faces the flinger and includes a though hole, and the rotary shaft penetrates the through hole,
the distal end of the peripheral wall and the bottom wall of the rotary joint hosing are detachable attached to each other.

5. The spindle protection structure according to claim 4, wherein the flinger is accommodated in a space defined by the motor housing, the peripheral wall, and the bottom wall.

6. The spindle protection structure according to claim 4, wherein a fitting portion configured to be fitted with the bottom wall is formed at a distal end of the peripheral wall.

* * * * *